C. B. COE.
DISK PLACING MECHANISM FOR TALKING MACHINES.
APPLICATION FILED JUNE 12, 1919.

1,410,734.

Patented Mar. 28, 1922.
6 SHEETS—SHEET 1.

Inventor
Charles B. Coe
By W. W. Williamson
Atty.

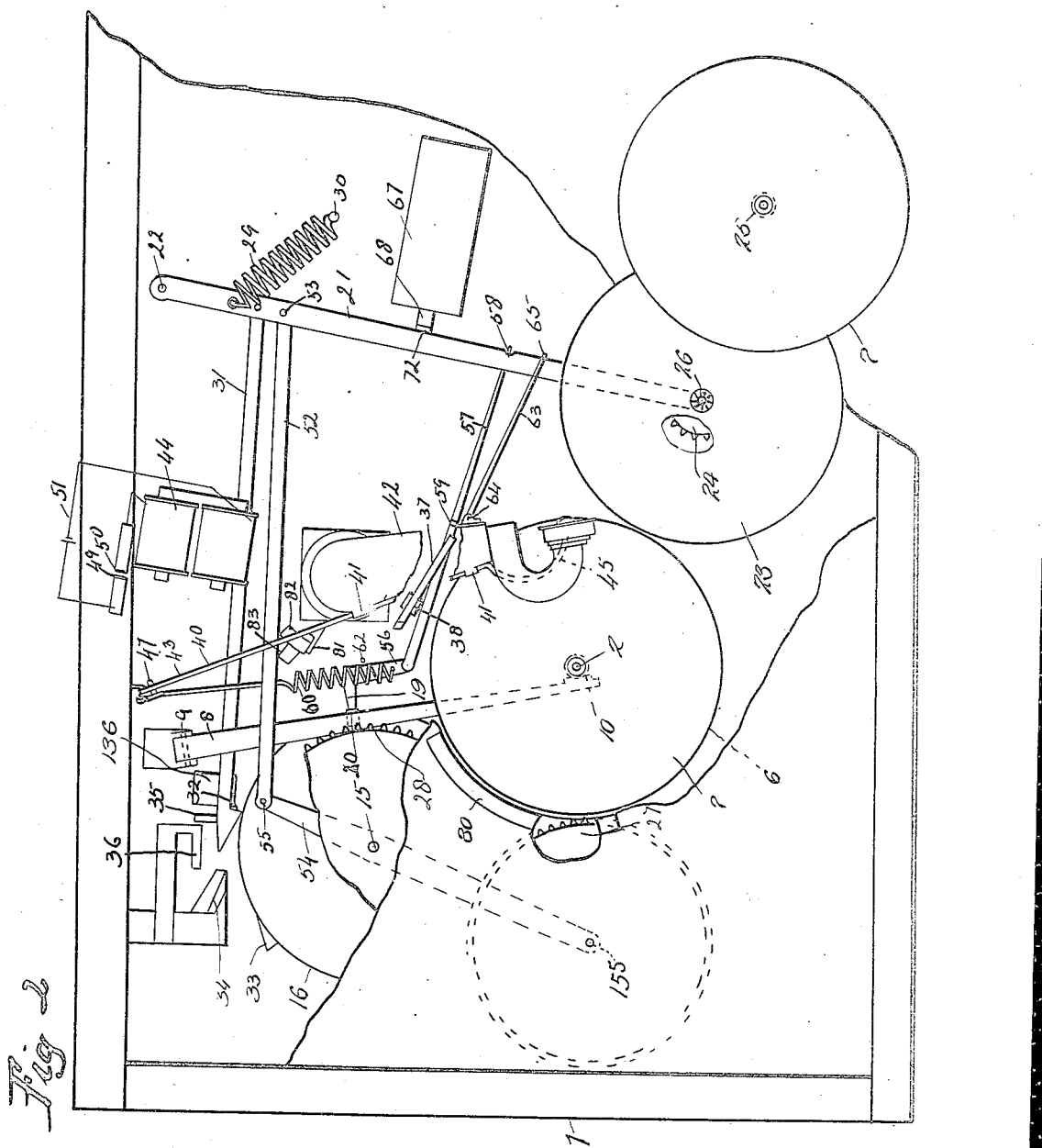

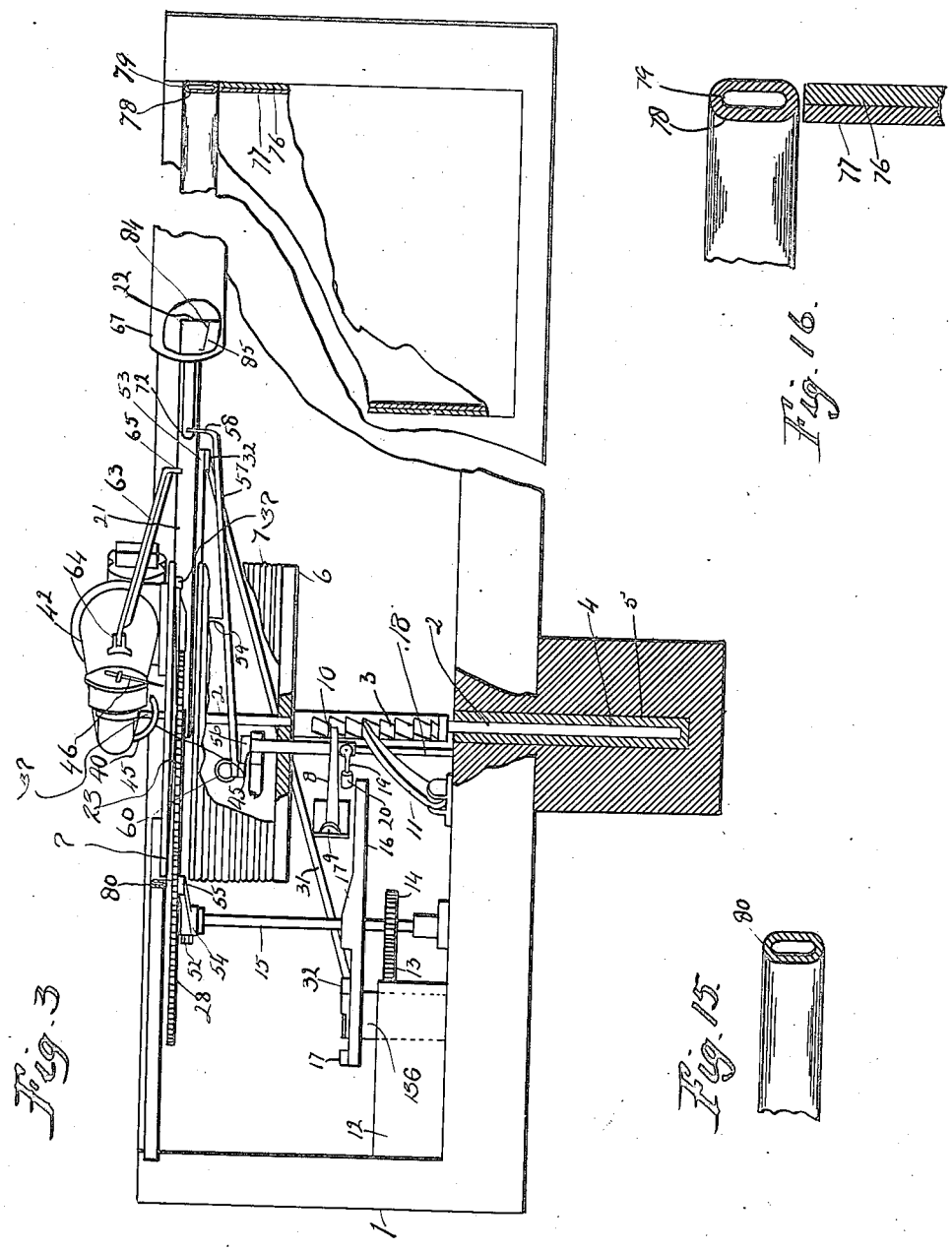

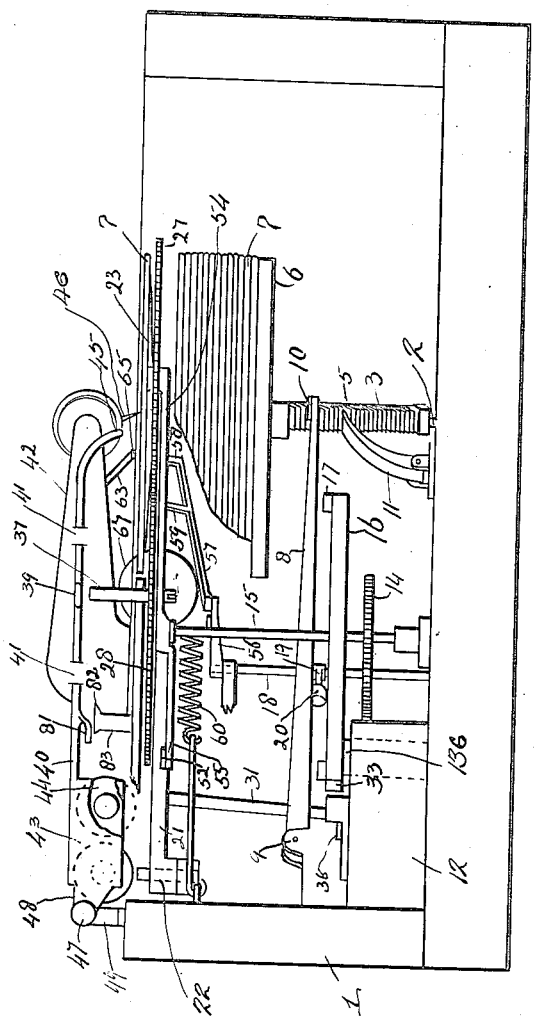

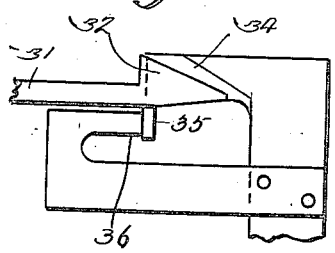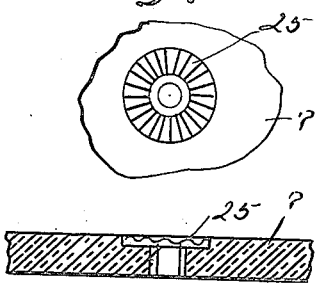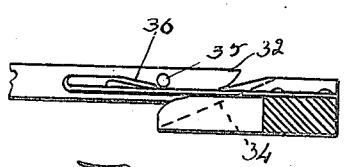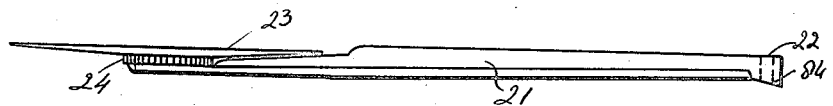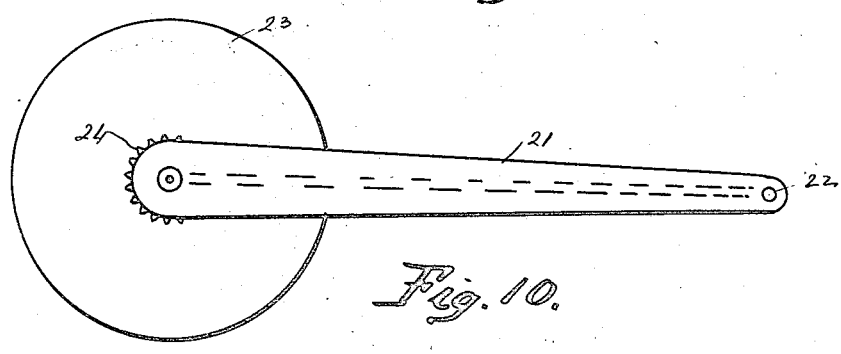

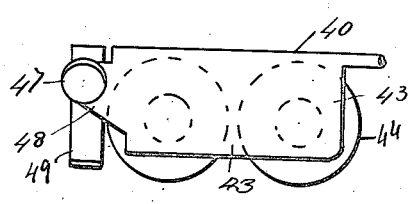
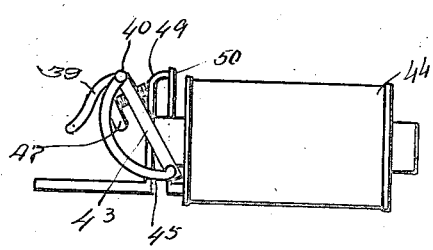
Fig. 11.  Fig. 12.
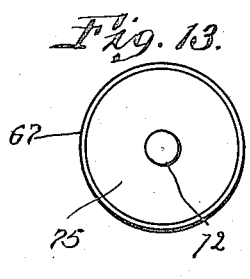
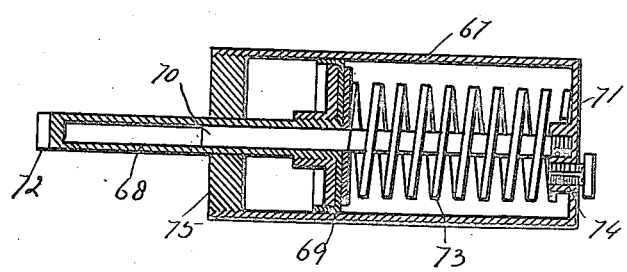
Fig. 13.  Fig. 14.
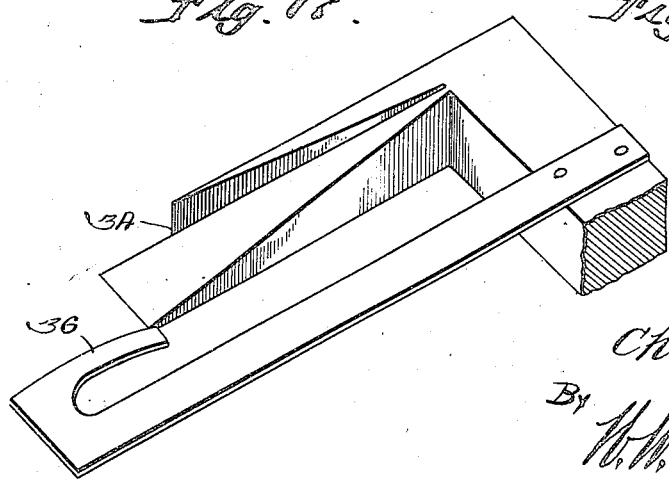
Inventor
Charles B. Coe
By W. W. Williamson
Atty.

UNITED STATES PATENT OFFICE.

CHARLES B. COE, OF MERCHANTVILLE, NEW JERSEY.

DISK-PLACING MECHANISM FOR TALKING MACHINES.

1,410,734. Specification of Letters Patent. Patented Mar. 28, 1922.

Application filed June 12, 1919. Serial No. 303,751.

*To all whom it may concern:*

Be it known that I, CHARLES B. COE, a citizen of the United States, residing at Merchantville, in the county of Camden and State of New Jersey, have invented new and useful Improvements in Disk-Placing Mechanism for Talking Machines, of which the following is a specification.

My invention relates to a new and useful improvement in disk playing mechanism for talking machines, and has for its object to provide means for automatically bringing a series of record disks one after the other in position to be played and removing the same one by one after they have been played.

A further object of my invention is to provide for the depositing of said disks in a receptacle as they are removed from the playing position.

A still further object of my invention is to provide means for bringing the needle of the sound box into proper position upon the record to be played, and elevate said needle therefrom after it has been played and prior to this record being displaced for the succeeding one.

With these ends in view my invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of my application, in which:—

Fig. 2, is a view similar to Fig. 1 showing the position of the parts when the record is being discharged.

Fig. 3, is a side elevation partly in section and partly broken away looking in the direction of the arrow in Fig. 1, the side casing being removed.

Fig. 4, is an end elevation looking in the direction of the arrow 2, Fig. 1 partly in section and partly broken away the end of the casing being removed.

Fig. 5, is an enlarged, detail plan view of the locking and retrieving mechanism.

Fig. 6, is an elevation of Fig. 5.

Fig. 7, is an enlarged, bottom plan of the center portion of one of the record disks showing the corrugations for transmitting rotation to the disks.

Fig. 8, is a section of Fig. 7.

Fig. 9, is a side elevation of the disk supporting arm and the turn table carried thereon.

Fig. 10, is a bottom plan view of Fig. 9.

Fig. 11, is an enlarged, end view of the magnet and its armature for actuating the needle lifting and releasing the disk removing mechanism.

Fig. 12, is a side elevation of Fig. 11.

Fig. 13, is an enlarged end view of the cushioning mechanism.

Fig. 14, is a central section of Fig. 13.

Fig. 15, is an enlarged section of the pneumatic cushion for centering the record disks.

Fig. 16, is a section of the pneumatic cushion for resting the movement of the disks when discharged.

Fig. 17, is a perspective view of the double face cam and the associated spring rest.

Figure 1:
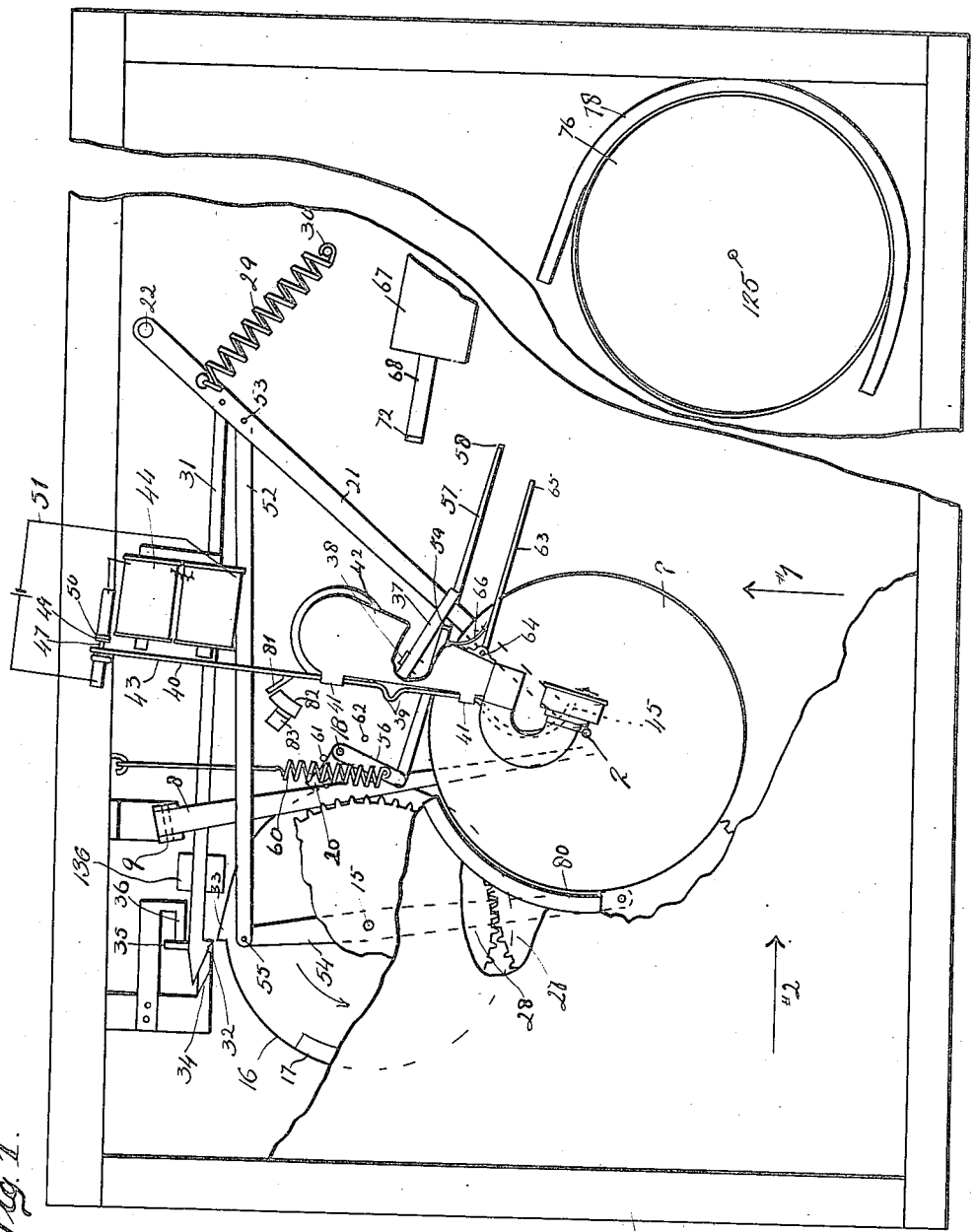
Fig. 1, is a plan view of talking machine having my improvements applied thereto, portions of the device being broken away to more clearly illustrate the operating parts thereof, the mechanism being in the position assumed at or near the end of the playing of the top record.

In carrying out my invention as here embodied, 1 represents the casing of a talking machine which may be of any desired shape or construction adapted to contain and support my improved operating mechanism. 2 is a vertical post having the toothed rack 3 fitted to slide thereon, and a shank 4 projecting downward into the socket 5 in which it is rigidly secured. The table 6 is carried by the toothed rack 3 for supporting a series of record disks 7, and the post 2 passing through the center hole in each disk, and in order that the series of disks may be elevated step by step I provide an arm 8 pivoted at 9 having a spring pawl or resilient lip 10 upon its outer end adapted to engage with the teeth of the toothed rack 3 so that when the outer end of this arm is raised it will lift the table 6 a corresponding distance, the latch 11 engaging with said teeth serving to hold the table in each step by step elevation.

As will be hereinafter described, the toothed rack 3 is raised a greater distance than the space between two adjacent teeth of the rack but less than the two spaces between three adjacent teeth so that after being lifted the distance of slightly less than two spaces or steps and released the rack will drop back until the latch 11 engages the succeeding tooth and holds the rack at an elevated height of one space or step.

12 represents a motor of any suitable design, a gear wheel 13 of which meshes with the gear 14 carried by the spindle 15 for rotating the latter and on this spindle is secured a cam wheel 16 having cams 17 upon its upper face, which cams are for the purpose of intermittently lifting the arm 8 at predetermined times through the mechanism hereafter described.

18 represents a vertical rock shaft journalled in suitable bearings having a short arm 19 pivoted thereto upon which is journalled a roll 20, this roll being at the proper height to pass between the arm 8 and the cam wheel 16 when the shaft 18 is given a rocking movement, and when this roll is swung between the arm and the cam wheel the constant revolving of the cam wheel will cause one of the cams 17 thereon to lift the roll 20 which in turn will lift the arm 8 moving the toothed rack 3 and its supporting table upward.

The roll 20 is of such diameter as to raise the supporting table 6, with the record disks 7 thereon and the intermediate elements a distance equal to slightly less than two spaces on the rack 3 so that one tooth of the rack will have been disengaged from the latch 11 and the succeeding lower tooth will pass beyond said latch for some distance, say ⅞ of the space between the second and third teeth, then when the cam 17 is disengaged from the roll 20, the supporting table 6 with the rack 3 and all but the uppermost record disk, as later mentioned, will take a retrograde movement or drop the ⅞ of the second space or until the succeeding tooth on the rack engages the latch 11 which will support the table 6 in an elevated position, equal to one space on the rack, above its former position, thus removing the present uppermost record disk on the table 6 away from the former uppermost disk.

The swinging of the roll 20 between the cam wheel and arm 8 is timed by the mechanism hereafter described so as to take place when a record disk has finished playing in order that a new record may be brought into the playing position after a played record has been removed from the post.

21 represents an actuating arm pivoted at 22 and having journalled upon its outer end the turn table 23 which latter has formed with or secured to its underside the pinion 24 by which rotation is imparted thereto from a train of gears hereafter described. This turn table is in the form of a disk of wedge shape in cross section in order that its edges may be sufficiently thin to enter between the topmost record disk on the supporting table 6 and the record disk next beneath, the rounded edges of the record disk facilitating this entrance.

When the actuating arm 21 is in the position shown in Fig. 1 the turn table carried thereby will be in a central position over the post 2 with the top record disk riding upon said turn table the same as in ordinary disk record talking machines so that as the turn table is rotated this top disk will be rotated for playing purposes. In order that there may be no undue slippage between this record disk and the turn table, I prefer to roughen or corrugate the underside of each record disk around the center thereof as indicated at 25. These corrugations are adapted to engage with corresponding corrugations 26 formed upon the upper face of the turn table around the center section thereof.

When the turn table is in the central position just described the pinion 24 carried thereby will be in mesh with the idle gear 27 which latter meshes with the gear 28 carried upon the upper end of the spindle 15 which as before described is revolved by the motor 12.

The actuating arm 21 has attached thereto one end of the spring 29, the opposite end being attached to the casing at 30 for swinging this arm in one direction, and the latter is drawn in the opposite direction against the action of this spring by the rod 31 which is pivoted to said actuating arm, and has a latch shaped head 32 formed upon its free end, which latch is adapted to be engaged by the tooth 33 projecting from the periphery of the cam wheel 16 and this engagement by the rotation of the cam wheel in the direction of the arrow will swing the actuating arm against the action of the spring 29 until the turn table is brought into the position shown in Fig. 1.

In order that the latch 32 may be disengaged from the tooth 33 after it has been moved the proper distance, I provide a double face cam 34 with which the head of the latch comes in contact during the movement just described, and is drawn out of engagement with the tooth 33 and at the same time elevated sufficiently to permit the pin 35 carried by said latch to pass above the normal position of the spring rest 36 said rest snapping beneath the pin after a given elevation thereof so that thereafter the pin will be supported by said rest until the rod 31 and its latch has been moved in the reversed direction sufficiently to permit the pin to drop from off said rest 36 onto a support 136 which will hold the latch in line with the cam wheel 16 and the outward movement of the actuating arm 21 will again bring the latch into the path of the tooth 33.

When the actuating arm 21 has been brought to the position shown in Fig. 1 and just prior to the disengagement of the latch 32 from the tooth 33 said arm is locked in this position by the hook end of the locking lever 37 engaging with said arm thus holding the turn table in its central position over the record supporting table during the time in which the topmost record disk or the one resting upon the turn table is being played. This locking lever is pivoted at 38 and has its inner end projecting upward into close proximity to the offset 39 formed upon the rocking rod 40 so that when this rod is turned upon its axis the offset will depress the inner end of the locking lever elevating its opposite end thereby releasing the actuating arm 21.

The rocking rod 40 is journalled in the bearings 41 carried by the reproducer arm 42 of the talking machine and projects rearward beyond the center of the point of swing of said reproducer arm so that when said arm is being swung by the playing of the record this rear portion of the rocking rod travels in the reversed direction of the sound box end of said arm. From the rear portion of the rocking rod depends an armature 43 which the swinging of the reproducer arm brings into the magnetic field of the poles of the electromagnet 44 so that when said magnet is energized as hereafter explained the attracting of this armature by said magnet will rock the rod 40 upon its axis and in so doing trip the actuating lever 21 by the depression of the inner end of the locking lever 37 through the medium of the offset 39 as before described.

The end portion of the rocking rod 40 is formed in the shape of a lifting finger 45 which lies beneath the sound box of the reproducer arm so that when said rod is rocked upon its axis just described this finger will lift the playing needle 46 out of contact with the record which has just finished being played and in order that this record may be discharged when the actuating arm 21 is released as before set forth.

The poles of the magnet are preferably bevelled as clearly shown in Fig. 12 in order that the armature may be more effectively acted upon when the magnet is energized, and this energizing of the magnet is brought about by the point of the adjusting screw 47 which is threaded through the extension 48 of the armature forcing the contact spring 49 against the contact spring 50 which closes the electric circuit 51 in which the magnet is included. This closing of the electric circuit takes place during the final travel of the playing needle upon the record since this travel of the needle swings the reproducer arm toward the center of the record disks, and in so doing swings the adjusting screw carried upon the outer end of the armature into contact with the contact spring 49, thus timing the lifting of the playing needle from the record and releasing of the actuating arm 21 by means of which the last played record will be discharged as hereafter described.

The connecting link 52 is journalled on the actuating arm 21 at 53 and connected to the lever 54 by the pin 55, this lever 54 being journalled about the center of the shaft 15 carries upon its other end the idler gear 27 which is journalled at 55 so that when the arm 21 moves in response to the spring 29 the idler gear will be carried out of mesh with the actuating gear 24 also out of interference with the rising disks as clearly shown in Fig. 2.

Upon the vertical rocking shaft 18 is mounted the lever 56 which carries the arm 57 extending under the actuating arm 21 and having formed upon it an outer stop 58 and an inner stop 59 the lever 56 is held in both of its positions by the spring 60 which in Fig. 1 is holding it against the stop 61 and in Fig. 2 holding it against the stop 62 the spring having been extended past the center of the shaft 18 the purpose of which will hereafter be made clear, the reproducer arm 42 carries an extension rod 63 centered in the bracket 64 and having a downwardly extending end 65 this is held in approximately in the position shown by the spring 66 which may be of any well known construction.

67 is a cushioning mechanism which is fully shown in Fig. 14 the piston rod 68 carries a piston 69 and is made hollow, so as to be guided by the post 70 which is attached to the head 71, upon the end of the piston rod 68 is mounted a soft cushion of any suitable material 72, the piston is actuated in one direction by the spring 73 and its movements in the other direction is controlled by the outlet valve 74 the head 75 is screwed into place so that the interior mechanism can be readily assembled. 76 is a receptacle into which the played records are discharged by the arm 21, it is lined with felt or some other suitable material and is of such diameter that the played disks will just float downwards, as the air contained below them is released through the small opening of the record disk in the center as shown at 125, immediately above this receptacle is mounted the pneumatic cushion 78 having a chamber 79 which may be inflated so as to prevent the disks from being injured when they are thrown against it by the actuating arm 21. Upon the cover of the casing 1 is mounted a cushion 80 which is made resilient so that when the new disk is elevated and pressed against it will center the same in the turn table 23.

Upon the rocking arm 40 is mounted an extension 81 which travels under the lip 82, carried by the bracket 83 attached to the casing cover, when the reproducer arm 42 is moving toward the edge of the record disk on the turn table and this will prevent the rocking arm 40 rotating on its axis thus holding the needle out of contact with the record during the necessary movements to reset the reproducer arm. After the reproducer arm has moved a sufficient distance toward the edge of the turntable, when the latter is considered as in its playing position, the extension 81 will pass beyond the end of the lip 82 and permit the rocking arm 40 to rotate causing the needle to assume the proper position for playing and during the time a record is being played and the reproducer arm moving toward the center of the record the extension 81 will pass over the lip 82.

As the turntable 23 is projected beneath the uppermost record disk on the table 6 by the movements of the actuating arm 21 said turntable and disk will be elevated by the wedge shaped or beveled hub 84, Fig. 9, which rides upon the wedge or beveled portion 85, Fig. 3 of the pivot 22 thereby raising the outer end of the arm 21, the turntable 23, its gear 24 and the record disk on said turntable above the pile of record disks on the table 6 which will permit the actuating arm 21 and the other elements to pass over the pile of record disks without interference and the space between the actuating arm 21 and the pile of record disks will be further increased by the retrogade movement of the supporting table 6 when the arm 17 passes beyond the roll 20 as above stated.

The operation of my improved mechanism is as follows:—

In Fig. 1 the playing disk and all of the parts are shown in the position they will assume at the end of the playing of a composition the reproducing head rapidly converging towards the center and therefore carrying the adjusting screw 47 into contact with the circuit closing devices 49 and 50; the first action of the electromagnets attracting the armature 43 will be a rocking movement of the shaft 40 which will naturally lift the playing needle 46 out of contact with the record, it is of considerable importance that the armature 43 shall hang vertically and so maintain an appreciable distance between the finger 45 and the playing head at all times when the needle 46 is in contact with the record, otherwise the needle will not be free to take up the necessary vibration from the record. Having lifted the needle the armature coming into closer contact with the bevelled pole pieces of the magnet the offset 39 of the rod 40 will contact with and depress the extension of the locking lever 37 so that the hook engaging the actuating arm 21 will be lifted and the arm freed to respond to the impulse of the spring 29, the actuating arm 21 will therefore move very rapidly until it makes contact with the cushion end 72 of the piston rod when it will stop more or less suddenly, the further movement being slow and gradual and controlled by the outlet valve 74, the actuating arm 21 and the turn table 23 having been suddenly retarded the played disk will continue to move from its own momentum until brought to rest by the cushion 78 and allowed to sink into the receptacle 76, slowly as the air escapes through the central opening. The actuating arm 21 will then make contact first with the downward extending end 65 of the rod 63 and will gently draw the reproducing head in the same direction that it is travelling in; the extension 81 on the rocking arm 40 being depressed will pass under the lip 82, and a sliding further movement of 21 will allow the circuit closers 49 and 50 to open and break the circuit so that the armature 43 is free from any magnetic attraction and this movement of the rocking arm 40 and reproducer head will continue until the position shown in Fig. 2 is attained when the extension 81 will be freed and the needle allowed to come down upon the new record; it will be seen that all of the actuating parts attached to the reproducer head do not make contact with anything during the period when the needle is in contact with the record. A sliding further movement of the actuating arm 21 makes contact with the outer stop 58 of the arm 57 this movement swinging the roll 20 between the cam wheel 16 and the lifting arm 8 so that the lifting mechanism 10 will move the stack or records upward. The first movement of the actuating arm 21 has however through the connecting link 52 moved the idler gear 27 entirely out of the path of the rising records so that by the time the actuating arm has taken the position there shown the records have been raised the extension 81 freed and the needle 46 allowed to make contact with the new disk. At this time when the actuating arm 21 has taken the position shown in Fig. 2 the pin 35 attached to the rod 31 will drop off the end of the spring 36 so as to come into the path of the tooth 33 mounted upon the cam wheel 16 which as before described is driven by the motor 12 and is therefore in continuous motion; then the contact between the tooth 33 and the latch shaped head 32 will be made upon next revolution of the cam wheel 16, the actuating arm 21 will be moved towards its position shown in Fig. 1 the wedge shaped edge of the turn table will be inserted between the raised record and the one immediately below it, the record will therefore be forced in the direction of the cushion 80 and so held in a raised position because the actuating arm 21 is gradually being raised by the wedge shaped edge so that when the actuating arm 21 comes into the position shown in Fig. 1 the new disk will have been raised into its playing position and the gear 24 will be in alignment to mesh with the idler gear 27, but during the backward movement of the actuating arm 21 it makes contact with the upward extending stop 59 upon the arm 57 which in turn throws the roll 20 out of the path of the cam wheel 16 and therefore allows the toothed rack 3 to lower onto the supporting latch 11, this movement is sufficient to just bring the actuating arm 21 clear of the top face of the stack of records supported upon the table 6 as the actuating arm 21 is made to complete its travel, the pin 35 due to the action of the double cam 34 is made to travel as previously described so as to disengage the latch 32 from the tooth 33 as it passes under the spring latch 36 and at the time that the locking lever 37 engages the actuating arm 21 so that it will maintain its position as shown in Fig. 1, and at which time the idler gear 27 engages with the gear 24 thereby rotating the turn table on which the new record is supported in the ordinary manner, the resilient cushion 80 having allowed the record to center itself, the playing of the new record immediately commences.

Of course I do not wish to be limited to the exact details of construction as herein shown as these may be varied within the limits of the appended claims without departing from the spirit of my invention.

Having thus fully described my invention, what I claim as new and useful is:—

1. In a machine of the character described, the combination of a supporting table, means for step by step elevating said table, a turn table, means for interposing said turn table between the top record disk and the remainder of such disks supported by the first named table, means for revolving the turn table, and means for automatically discharging the top record disk from the turn table when said top disk has finished playing.

2. In a machine of the character described, the combination of a supporting table, means for step by step elevating said table, a turn table, means for interposing said turn table between the top record disk and the remainder of such disks supported by the first named table, means for revolving the turn table, means for automatically discharging the top record disk from the turn table when said top disk has finished playing, and means for swinging the sound box to the position for starting the playing of a succeeding record.

3. In a machine of the character described, the combination of a supporting table, means for step by step elevating said table, a turn table, means for interposing said turn table between the top record disk and the remainder of such disks supported by the first named table, means for revolving the turn table, means for automatically discharging the top record disk from the turn table when said top disk has finished playing, means for swinging the sound box to the position for starting the playing of a succeeding record, and means for putting the playing needle into contact with the succeeding disk.

4. In a talking machine having a swinging reproducer arm and a sound box pivotally connected thereto, the combination of a supporting table for carrying a nest of record disks, means for elevating said supporting table step by step at predetermined times, a turn table, means for swinging said turn table beneath the top record disk when the latter is elevated, means for revolving said turn table and the top disk thereon, means for elevating the playing needle carried by the sound box out of contact with the top record, means for swinging said turn table outward for discharging the top disk, means dependent upon the outward movement of the turn table for returning the reproducer arm to the position for starting the playing of a new record, and means for placing the playing needle carried by the sound box into contact with the succeeding record.

5. In a talking machine having a swinging reproducer arm and a sound box pivotally connected thereto, the combination of a supporting table for carrying a nest of record disks, means for elevating said supporting table step by step at predetermined times, a turn table, means for swinging said turn table beneath the top record disk when the latter is elevated, means for revolving said turn table and the top disk thereon, means for elevating the playing needle carried by the sound box out of contact with the top record, means for swinging said turn table outward for discharging the top disk, means dependent upon the outward movement of the turn table for returning the reproducer arm to the position for starting the playing of a new record, means for placing the playing needle carried by the sound box into contact with the succeeding record, and means for retarding the outward swing of the turn table through a portion of its movement.

6. In combination with a talking machine having a swinging reproducer arm, a sound box pivotally connected thereto and a playing needle carried by said sound box, a non-revolving supporting table for carrying a nest of record disks, means for elevating said table step by step at predetermined times, means for holding said table in each step by step elevation, an operating arm, a turn table journalled upon the outer end of said arm, a pinion carried by the turn table, means for swinging said operating arm in such manner as to carry the turn table beneath the top record disk, means carried by the turn table and the record disks for causing each of said disks to revolve with the turn table when resting thereon, an idler gear, means for swinging said idler gear in mesh with the pinion carried by the turn table when said turn table has taken the top record disk, means for putting the playing needle into contact with the top disk, means controlled by an electric circuit for elevating the playing needle from the disk when the disk has ceased playing, means for swinging the operating arm outward after the needle has been elevated, means dependent upon the movement of the operating arm for returning the reproducer arm to its original position, means for holding the needle in its elevated position during this movement of the reproducer arm, means for retarding the outward movement of the operating arm during a portion of its travel, and means also dependent upon the outward movement of the operating arm for actuating the mechanism for elevating the supporting table.

7. In combination with a talking machine having a swinging reproducer arm, a sound box pivotally connected thereto and a playing needle carried by said sound box, a non-revolving supporting table for carrying a nest of record disks, means for elevating said table step by step at predetermined times, means for holding said table in each step by step elevation, an operating arm, a turn table journalled upon the outer end of said arm, a pinion carried by the turn table, means for swinging said operating arm in such manner as to carry the turn table beneath the top record disk, means carried by the turn table and the record disks for causing each of said disks to revolve with the turn table when resting thereon, an idler gear, means for swinging said idler gear in mesh with the pinion carried by the turn table when said turn table has taken the top record disk, means for putting the playing needle into contact with the top disk, means controlled by an electric circuit for elevating the playing needle from the disk when the disk has ceased playing, means for swinging the operating arm outward after the needle has been elevated, means dependent upon the movement of the operating arm for returning the reproducer arm to its original position, means for holding the needle in its elevated position during this movement of the reproducer arm, means for retarding the outward movement of the operating arm during a portion of its travel, means also dependent upon the outward movement of the operating arm for actuating the mechanism for elevating the supporting table, a receptacle for receiving the discharged record disks, and a pneumatic device for stopping said disks in the proper position to fall into said receptacle.

8. In combination with a talking machine having a swinging reproducer arm, a sound box pivotally connected thereto and a playing needle carried by said sound box, a non-revolving supporting table for carrying a nest of records, means for elevating said table step by step at predetermined times, means for holding said table in each step by step elevation, an operating arm, a turn table journalled upon the outer end of said arm, a pinion carried by the turn table, means for swinging said operating arm in such manner as to carry the turn table beneath the top record disk, means carried by the turn table and the record disks for causing each of said disks to revolve with the turn table when resting thereon, an idler gear, means for swinging said idler gear in mesh with the pinion carried by the turn table when said turn table has taken the top record disk, means for putting the playing needle into contact with the top disk, means controlled by an electric circuit for elevating the playing needle from the disk when the disk has ceased playing, means for swinging the operating arm outward after the needle has been elevated, means dependent upon the movement of the operating arm for returning the reproducer arm to its original position, means for holding the needle in its elevated position during this movement of the reproducer arm, means for retarding the outward movement of the operating arm during a portion of its travel, means also dependent upon the outward movement of the operating arm for actuating the mechanism for elevating the supporting table, a receptacle for receiving the discharged record disks, a pneumatic device for stopping said disks in the proper position to fall into said receptacle, and a resilient cushion for facilitating the delivery of the top disk to the turn table.

9. A talking machine comprising a support for a pile of records, means for intermittently raising said support, a pivoted actuating arm, a turntable carried thereby and means for moving said actuating arm to project the turntable beneath the uppermost record of the pile.

10. A talking machine comprising a support for a pile of records, means for intermittently raising said support, a pivoted actuating arm, a turntable carried thereby, means for moving said actuating arm to project the turntable beneath the uppermost record of the pile and means for elevating said actuating arm as it carries the turntable beneath the record.

In testimony whereof, I have hereunto affixed my signature.

CHARLES B. COE.